United States Patent [19]
Prince et al.

[11] Patent Number: 4,589,022
[45] Date of Patent: May 13, 1986

[54] BRIGHTNESS CONTROL SYSTEM FOR CRT VIDEO DISPLAY

[75] Inventors: John S. Prince, Vestal; Harold L. Herz; Edward P. Coleman, Jr., both of Binghamton, all of N.Y.

[73] Assignee: General Electric Company, Binghamton, N.Y.

[21] Appl. No.: 555,791

[22] Filed: Nov. 28, 1983

[51] Int. Cl.[4] .......................... H04N 5/202; H04N 5/58
[52] U.S. Cl. ...................................... 358/168; 358/164
[58] Field of Search .............. 358/168, 164, 169, 174, 358/242; 340/767

[56] References Cited

U.S. PATENT DOCUMENTS 4,005,262  1/1977  Fijisawa ............................ 358/169
4,415,921 11/1983  Mulvanny .......................... 358/168

FOREIGN PATENT DOCUMENTS 155884  9/1982  Japan .................................. 358/164

OTHER PUBLICATIONS

Microelectronics-Digital and Analog Circuits and Systems, by J. Millman, McGraw-Hill Book Company, pp. 50-52, published 1979.
Variable Gamma Corrector Improves Television Video Signals, by K. Freeman, et al., Electronic Engineering, Sep. 1970, vol. 42, No. 511, pp. 90-93.

Primary Examiner—Tommy P. Chin
Attorney, Agent, or Firm—I. David Blumenfeld

[57] ABSTRACT

A video brightness control system for high performance CRT displays including a buffer amplifier for receiving high speed video information and applying it to a gain control variable resistor serving as a contrast control. An ambient light sensor drives a nonlinear amplifier to provide an ambient light signal which is in proportion to the logarithm of the ambient light level over a wide range. A manual brightness control potentiometer is adjustable to provide a constant brightness signal. The video information signal, the ambient light signal, and the manual brightness control signal are added together by a summing device, with the resultant signal approximating a logarithmic characteristic. The output of the summing device is applied to a gamma correction amplifier which drives a video driver amplifier, the video amplifier, in turn, drives the CRT. The gamma correction amplifier and video driver in combination with the video transfer function of the CRT approximates an exponential transfer function, thereby creating CRT screen brightness which is an antilogarithmic function of the total video signal appearing at the gamma correction amplifier input. This results in automatic brightness control as a function of ambient light level, minimum interaction between brightness and contrast controls, and a gamma characteristic which provides a reasonable approximation to the variation of brightness difference threshold of the eye.

9 Claims, 1 Drawing Figure

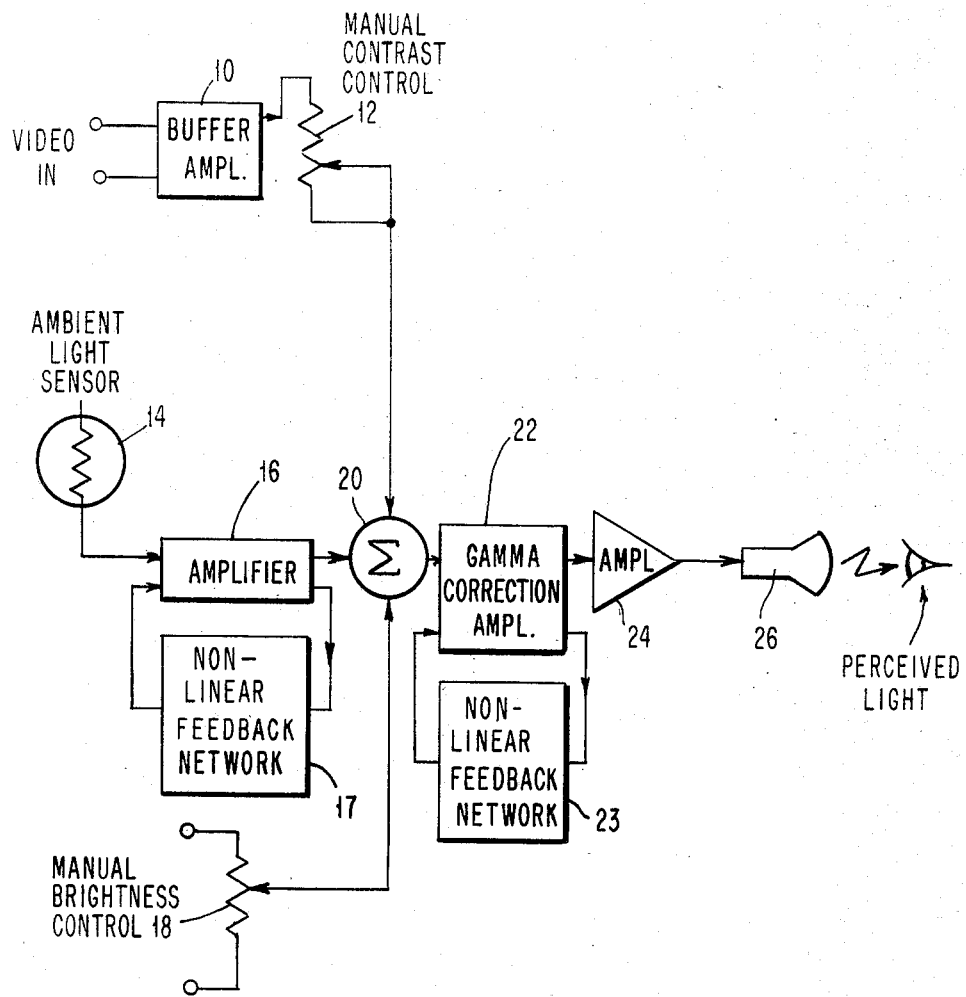

BRIGHTNESS CONTROL SYSTEM FOR CRT VIDEO DISPLAY

BACKGROUND OF THE INVENTION

1. Field Of The Invention

The present invention relates to Cathode Ray Tube Video displays, and more particularly to brightness control systems for high performance Cathode Ray Tube displays.

2. Description Of The Prior Art

The normal mode of operation of Cathode Ray Tube (CRT) Video displays involves applying a video signal, which is a linear function of the original scene brightness, to either the CRT grid or cathode. In the case of most computer generated displays, the video signal is applied in equal voltage steps to represent progressive changes in scene brightness. Because of the nonlinear transfer function of the CRT grid-cathode voltage to screen brightness characteristic and the great adaptability of the human eye, this type of control is suitable for many applications. The interaction of separate brightness and contrast controls also is tolerable in most situations. However, in critical high quality display applications with rapidly changing ambient light conditions, the above characteristics are unacceptable.

The necessary characteristics for high performance aircraft cockpit displays include automatic brightness control as a function of ambient level, minimum interaction between brightness and contrast controls, and a gamma characteristic which provides a reasonable approximation to the variation of brightness difference threshold of the eye. The gamma characteristic is the slope of the brightness/input voltage (exponential) transfer characteristic of the CRT. This latter requirement derives from the necessity of rapidly recognizing the maximum number of shades of gray in the video display, under widely changing conditions of ambient light level.

It is an object of the present invention to provide automatic brightness control for a CRT video display as a function of ambient light level. It is another object to provide automatic brightness control as a function of ambient light level for a high performance video display. It is another object to provide automatic brightness control for a CRT video display with minimum interaction between brightness and contrast control. It is a further object to provide an automatic brightness control system for a high quality CRT display which produces a gamma characteristic providing a reasonable approximation to the variation of brightness difference threshold of the eye.

SUMMARY OF THE INVENTION

These and other objects are achieved by the present invention which provides a video brightness control system for high performance CRT displays including a buffer amplifier for receiving high speed video information and applying it to a gain control variable resistor or other suitable gain control device serving as a contrast control. An ambient light sensor drives a nonlinear amplifier to provide an ambient light signal which is in proportion to the logarithm of the ambient light level over a wide range. A manual brightness control potentiometer provides a constant brightness signal which is adjustable by an operator for a comfortable viewing brightness level. The video information signal, the ambient light signal, and the manual brightness control signal are added together by a summing device, and the resultant signal approximates a logarithmic characteristic, such that the summation of signal currents applied at the input to a gamma correction amplifier corresponds to adding logarithms. The gamma correction amplifier is of the nonlinear type and drives a video driver amplifier to drive the CRT cathode. The gamma correction amplifier and video driver in combination with the video transfer function of the CRT approximates an exponential transfer function, thereby creating CRT screen brightness which is an antilogarithmic function of the total video signal appearing at the gamma correction amplifier input.

Studies have shown that over a large range of scene brightness, the perception of brightness and contrast is in proportion to the logarithm of the brightness. Therefore, in the present system, the eye perceives brightness and contrast of the CRT screen image in proportion to the total signal input to the gamma correction amplifier as a linear function. This results in a high performance display having automatic brightness control as a function of ambient light level, minimum interaction between brightness and contrast controls, and a gamma characteristic which provides a reasonable approximation to the variation of brightness difference threshold of the eye.

BRIEF DESCRIPTION OF THE DRAWING

FIG. 1 is a circuit diagram of the brightness control system of the present invention.

DESCRIPTION OF PREFERRED EMBODIMENT

Referring to FIG. 1, high speed video information is provided to the input to a buffer amplifier 10 which comprises a very high speed monolithic operational amplifier connected as a balanced differential video buffer. A gain control variable resistor 12 is connected to the output of buffer amplifier 10 and serves as a contrast control for the display system. An ambient light sensor circuit 14 consists of a cadmium sulfide photosensitive resistor in series with a fixed resistor. Sensor circuit 14 drives a nonlinear amplifier 16 which comprises an operational amplifier having a nonlinear feedback network 17 with multiple feed-back resistors operating in conjunction with diode clamps in a piecewise linear feedback (not shown) to provide an amplifier output signal which is in proportion to the logarithm of the ambient light level over a range which exceeds two decades.

A manual brightness control potentiometer 18 provides a constant brightness signal which is adjustable by the operator for a comfortable viewing brightness level. Also, a fixed bias signal can be provided although it is not shown.

The output of each of the manual contrast control resistor 12, the ambient light nonlinear amplifier 16, and the manual brightness control potentiometer 18 are added by a summing device 20 comprising, for example, summing resistors to produce a current sum which approximates a logarithmic characteristic such that the summation of signal currents through the summing device 20 corresponds to adding logarithms. The adjustment of contrast may be achieved by the selection of the specific value of the current summing resistor in summing device 20 in combination with the selection of the video voltage level of a computer symbol generator, not shown, which drives the video buffer amplifier 10.

A nonlinear gamma correction amplifier 22 is connected to the output of summing device 20 and comprises a very high speed monolithic operational amplifier with a nonlinear feedback network 23 having piecewise linear feedback which creates an overall nonlinear response to the input signal. Gamma correction amplifier 22 drives a fixed gain, linear hybrid integrated video driver amplifier 24, which, in turn, drives a CRT 26. The feedback network 23 of gamma correction amplifier 22, comprised of resistors and biased diodes, is adjusted to provide a total transfer function, from the nonlinear gamma correction amplifier 22, the video driver amplifier 24 and the video transfer function of the CRT 26, which, in combination, approximates a total transfer function that is exponential over nearly 5 decades of screen brightness. In this fashion, the total exponential transfer function of amplifiers 22 and 24 and the video transfer function of CRT 26 thereby creates a CRT screen brightness which is an antilogarithmic function of the total video signal appearing at the input to gamma correction amplifier 22. The entire circuit shown in the figure is replicated 3 times for driving the 3 electron guns of a high resolution color TV tube.

Studies of the human perception of brightness and contrast show that, except at very low levels near the visual threshold and at extremely high brightness levels, the brightness difference threshold of the eye is nearly proportional to the absolute brightness level. In other words, over a large range of scene brightness, the perception of brightness and contrast is in proportion to the logarithm of the brightness. In the system of the present invention, the summing current input to the gamma correction amplifier 22 approximates a logarithmic characteristic. Therefore, the eye perceives a screen image on the CRT having the brightness and contrast that is associated with a linear signal being fed into gamma correction amplifier 22. In this manner, the eye perceives the brightness on the CRT to be proportional to sensed changes in light or brightness levels.

It should be understood that the embodiment of the invention described herein is intended to be illustrative of the invention and that various changes can be made to such embodiment without departing from the spirit and scope of the invention.

We claim:

1. A brightness control system for a cathode ray tube video display, comprising:
   video information signal receiving means for receiving a video information signal including contrast control means for controlling the gain of said video information signal;
   ambient light signal generating means including an ambient light sensor means for providing a signal representation of the level of ambient light in a viewed scene, and a nonlinear amplifier connected to the output of said ambient light sensor means to provide an amplified ambient light signal which is in proportion to a logarithm of the ambient light level;
   manual brightness control signal means for providing a manually adjusted brightness control signal;
   a summing means connected to receive the output of said video information signal receiving means, said nonlinear amplifier and said manual brightness control signal means, thereby providing a summation signal therefrom which corresponds to a logarithmic addition of said signals;
   nonlinear gamma correction amplifier means connected to receive said summation signal from said summing means;
   video driver amplifier means connected to the output of said nonlinear gamma correction amplifier means; and
   cathode ray tube means connected to said video driver amplifier means;
   said gamma correction amplifier means, said video driver amplifier means and said cathode ray tube means in combination having an exponential transfer function which is an antilogarithmic function of said summation signal appearing at the input to said nonlinear gamma correction amplifier means, whereby a perceived screen image on said cathode ray tube means has a brightness and contrast that is associated with a linear said summation signal being fed into said gamma correction amplifier means.

2. A brightness control system as recited in claim 1 wherein said contrast control means in said video information signal receiving means includes a buffer amplifier for receiving and amplifying said video information signal.

3. A brightness control system as recited in claim 2 wherein said buffer amplifier of said video information signal receiving means comprises a high speed monolithic operational amplifier connected as a balanced differential video buffer.

4. A brightness control system as recited in claim 2 wherein said contrast control means in said video information signal receiving means further includes a gain control variable resistor connected to the output of said buffer amplifer.

5. A brightness control system as recited in claim 1 wherein said ambient light sensor means comprises a cadmium sulfide photosensitive resistor.

6. A brightness control system as recited in claim 1 wherein said nonlinear amplifier of said ambient light signal generating means comprises an operational amplifier having a nonlinear feedback network which provides an amplifier output signal which is in proportion to the logarithm of the ambient light level over a range which exceeds two decades.

7. A brightness control system as recited in claim 1 wherein said manual brightness control signal means includes a potentiometer for providing a constant brightness control signal which can be adjusted for a comfortable viewing brightness level.

8. A brightness control system as recited in claim 1 wherein said gamma correction amplifier means comprises a high speed monolithic operational amplifier including a nonlinear feedback network, said network having piecewise linear feedback adjusted to provide a total transfer function from the output of said summing means to said cathode ray tube means which is exponential over several decades of screen brightness.

9. A brightness control system for a cathode ray tube video display, comprising:
   video information signal means for receiving a video information signal;
   manual brightness control signal means including means for manually adjusting the amplitude of a brightness control signal;
   summing means connected to receive outputs of said video information signal means and said manual brightness control signal means to thereby provide a summation signal therefrom which corresponds to a logarithmic addition of said signals;

nonlinear gamma correction amplifier means connected to the output of said summing means;

video driver amplifier means connected to the output of said nonlinear gamma correction amplifier means; and cathode ray tube means connected to said video driver amplifier means;

said gamma correction amplifier means, said video driver amplifier means and said cathode ray tube means in combination having an exponential transfer function which is an antilogarithmic function of said summation signal appearing at the input to said nonlinear gamma correction amplifier means, whereby a perceived screen image on said cathode ray tube means has a brightness that is associated with a linear said summation signal being fed into said gamma correction amplifier means.

* * * * *